(12) United States Patent
Zhang et al.

(10) Patent No.: US 9,875,727 B2
(45) Date of Patent: Jan. 23, 2018

(54) CIRCUIT AND DISPLAY DEVICE

(71) Applicants: Boe Technology Group Co., Ltd., Beijing (CN); Hefei Xinsheng Optoelectronics Technology Co., Ltd., Anhui (CN)

(72) Inventors: Yanping Zhang, Beijing (CN); Yuting Yang, Beijing (CN); Dayu Zhang, Beijing (CN); Xianjie Shao, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 31 days.

(21) Appl. No.: 14/500,126

(22) Filed: Sep. 29, 2014

(65) Prior Publication Data

US 2015/0348507 A1    Dec. 3, 2015

(30) Foreign Application Priority Data

May 29, 2014    (CN) ...................... 2014 2 0284127 U (51) Int. Cl.
```
G09G 3/36      (2006.01)
G09G 5/18      (2006.01)
G09G 3/20      (2006.01)
G06F 3/038     (2013.01)
```

(52) U.S. Cl.
CPC ................. *G09G 5/18* (2013.01); *G09G 3/20* (2013.01); *G09G 3/3677* (2013.01); *G09G 3/3696* (2013.01); *G06F 3/038* (2013.01); *G09G 2300/0426* (2013.01); *G09G 2300/08* (2013.01); *G09G 2310/0216* (2013.01); *G09G 2310/0267* (2013.01); *G09G 2310/0286* (2013.01); *G09G 2330/025* (2013.01)

(58) Field of Classification Search
CPC .................................. G09G 3/36; G06F 3/038
See application file for complete search history.

(56) References Cited

U.S. PATENT DOCUMENTS

| | | | | |
|---|---|---|---|---|
| 2002/0084959 A1* | 7/2002 | Park | ...................... | G09G 3/3648 345/87 |
| 2008/0049000 A1* | 2/2008 | Kim | ...................... | G09G 3/3677 345/204 |
| 2010/0110324 A1* | 5/2010 | Chang | ...................... | G09G 3/006 349/54 |

* cited by examiner

*Primary Examiner* — Jennifer Mehmood
*Assistant Examiner* — Carl Adams
(74) *Attorney, Agent, or Firm* — Calfee, Halter & Griswold LLP (57) ABSTRACT

A circuit arranged in a gate drive area on a display panel comprises control lines. Each control line is connected with multiple gate lines, and the gate lines connected with each control line are distributed at intervals on the display panel. A switch-on level can be provided sequentially to the control lines in a preset time interval when the display panel is being shut down. The circuit mitigates or otherwise eliminates a shutdown afterimage phenomenon and also avoids delivery of a relatively large instantaneous current generated at shutdown.

9 Claims, 8 Drawing Sheets

FIG. 1

PRIOR ART

FIG. 2

PRIOR ART

FIG. 3

PRIOR ART

FIG. 4

PRIOR ART

CIRCUIT AND DISPLAY DEVICE

RELATED APPLICATIONS

The present application claims the benefit of Chinese Patent Application No. 201420284127.6, filed May 29, 2014, the entire disclosure of which is incorporated herein by reference.

FIELD

This disclosure relates to display technology, and particularly to a circuit and a display device comprising the circuit.

BACKGROUND

Figure 1:
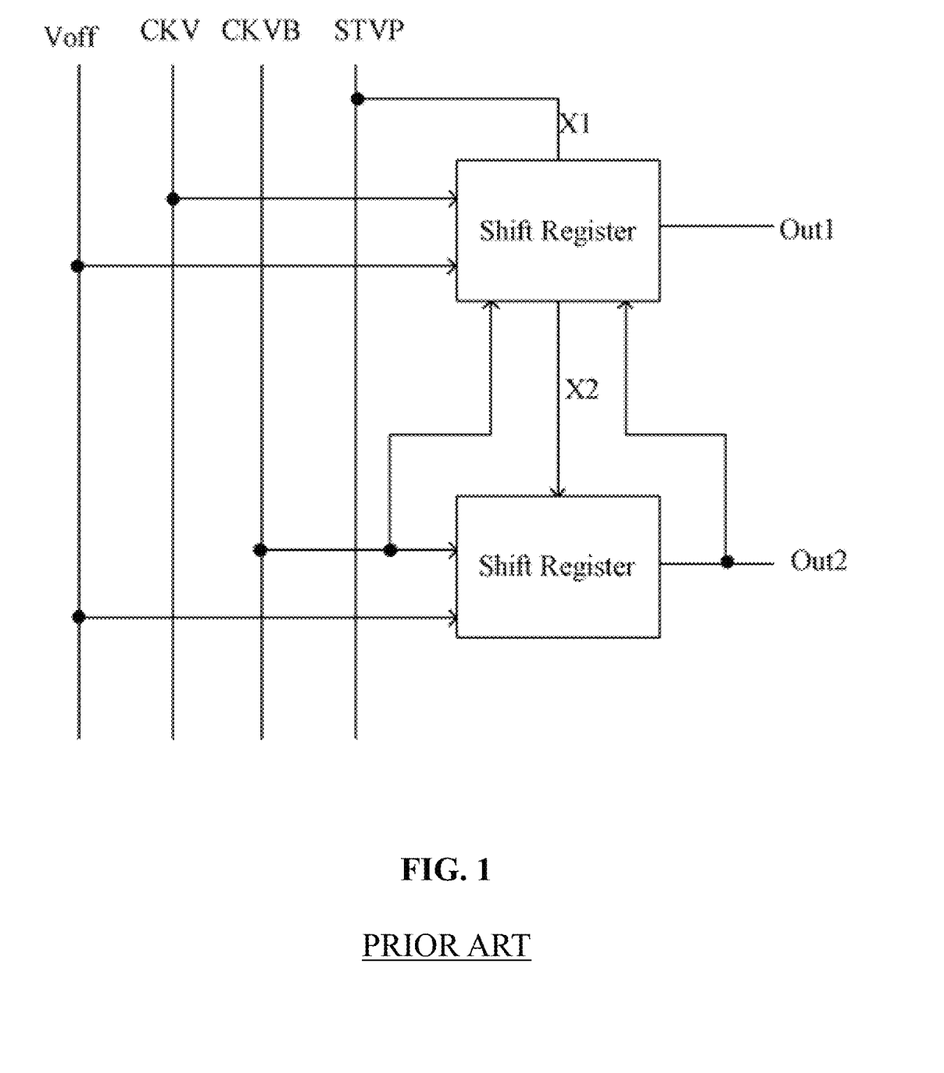
FIG. 1 is a basic principle diagram of a conventional GOA circuit.

Gate driver on array (GOA) technology is a technology of fabricating a gate drive circuit on an array substrate directly. The basic principle of the conventional GOA circuit is shown in FIG. 1. The shifting and switching of gate lines are generally realized by shift registers. The input ends of the shift registers include Voff, CKV, and CKVB. The input ends of a first stage shift register include a gate turn-off time signal Voff input end, a clock signal CKV input end, a reverse clock signal CKVB input end, and a start signal STVP input end. The output end of the first stage shift register is connected with a first stage gate line. The input ends of a second stage shift register (as well as all the shift registers after the second stage) include a Voff signal input end, a CKVB signal input end, and a STVP signal outputted by a former stage. The output end of the second stage shift register is connected with a second stage gate line. The signal outputted by the output end of the second stage shift register is also inputted to the first stage shift register as feedback signal. The connection principle of the subsequent stages is the same as above.

Figure 2:
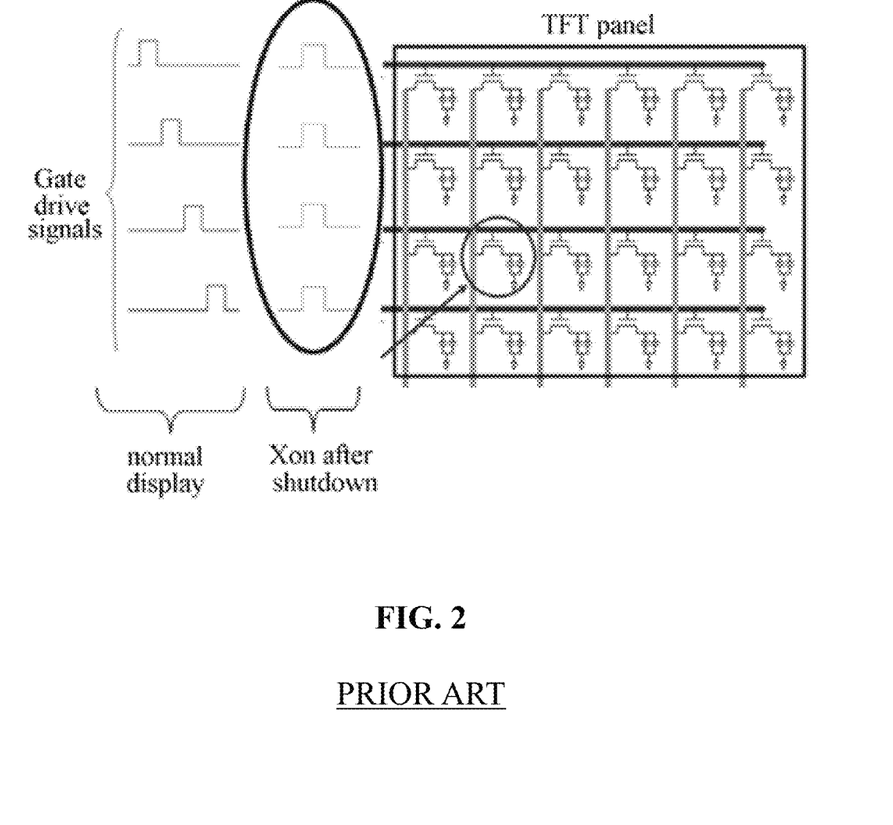
FIG. 2 is a diagram that shows timing of a conventional XON signal for implementing the XON function.

After a conventional thin film transistor liquid crystal display (TFT-LCD) is shut down, a phenomenon of shutdown afterimage occurs since there are residual charges in pixels on a liquid crystal display panel. In order to solve the problem of shutdown afterimage, an XON function circuit is generally employed, i.e., turning on all the thin film transistors (TFTs) at the moment of shutdown and switching on all the gate lines at the moment of shutdown, so as to enable the residual charges in the pixels to be released immediately. In this way, a display screen can recover to a white screen mode rapidly, thereby eliminating the shutdown afterimage. The timing of the XON signal which implements the XON function is shown in FIG. 2. FIG. 2 shows timing of a gate drive signal performing display normally and timing of an XON signal inputted when shutdown is carried out, wherein the XON signal can switch on all the TFTs simultaneously. FIG. 2 also shows a TFT panel, wherein a gate driver is connected laterally, and a source driver is connected longitudinally.

Figure 3:
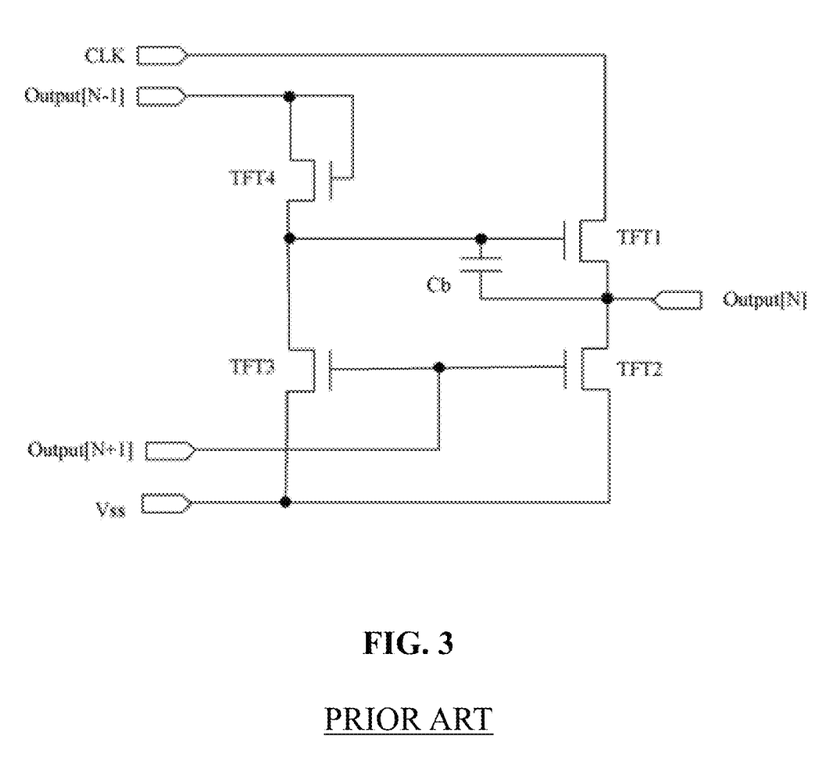
FIG. 3 is a schematic view of a conventional GOA circuit employing a 4T1C design.

The conventional GOA basic circuit usually employs a 4T1C structure, the design of which is shown in FIG. 3. The circuit comprises four transistors (i.e., TFT1, TFT2, TFT3, and TFT4) and a capacitor $C_b$. The circuit further comprises a clock signal end CLK, a low level signal end Vss, and three output ends Output[N−1], Output[N], and Output[N+1]. There are mutual relations among respective gate lines in the conventional GOA circuit, i.e., at the time of turning on a next row of gate line, turning off the previous row of gate line. Assuming that an XON signal is used in the conventional GOA circuit in order to eliminate the shutdown afterimage, both the output end of the N−1th stage Output [N−1] and the output end of the N+1th stage Output [N+1] need to be connected with the high level XON signal, so as to enable both transistors TFT3 and TFT4 to be switched on. On the other hand, since the drain of the TFT3 is connected with a low level signal Vss, when both the TFT3 and TFT4 are switched on, the level at the output end of the N−1th stage Output[N−1] should be a low level. However, since the output end of the N−1th stage Output[N−1] has been connected with a high level XON signal, a level conflict will occur at the output end of the N−1th stage Output[N−1]. Moreover, since the output end of the N+1th stage Output [N+1] is connected with a high level XON signal, TFT2 is switched on, such that the output end of the Nth stage Output[N] outputs a low level, thereby enabling the Nth stage of gate lines to be turned off, and the function of the XON signal for enabling all the gate lines to be switched on cannot be implemented. Therefore, the XON signal cannot be used in the conventional GOA circuit.

As a result, the conventional GOA circuit cannot switch on all the gate lines during shutdown as the XON signal cannot be used. Hence, the influence of shutdown afterimage cannot be eliminated in this manner.

SUMMARY

This disclosure provides a circuit and a display device comprising the circuit, which can avoid or at least mitigate one or more of the above problems. For example, the present disclosure provides a circuit and a display device that can eliminate or otherwise substantially reduce the presence of a shutdown afterimage.

According to an exemplary aspect of the present disclosure, a circuit arranged in a gate drive area on a display panel is provided. The circuit comprises a plurality of control lines, wherein each of the control lines is connected with a plurality of gate lines, and the gate lines connected with each control line are distributed at intervals on the display panel, and wherein a switch-on level is provided sequentially to the plurality of control lines in a preset time interval when the display panel is shut down.

By means of this circuit, an XON signal can be used in a GOA circuit, thereby mitigating or eliminating the problem of shutdown afterimage.

According to an exemplary aspect of the present disclosure, adjacent gate lines in the plurality of gate lines connected with each control line may be spaced by gate lines connected with other control lines in the plurality of control lines.

According to an exemplary aspect of the present disclosure, the number of the plurality of control lines is three, and adjacent gate lines in the plurality of gate lines connected with each control line may be spaced by two gate lines connected with other control lines in the plurality of control lines.

According to an exemplary aspect of the present disclosure, the number of the plurality of control lines may be greater than three.

According to an exemplary aspect of the present disclosure, each of the plurality of gate lines connected with each control line is connected with a respective control line by a switch transistor, wherein the gate of the switch transistor is connected with the respective control line, a first electrode of the switch transistor is connected with the gate line, and a second electrode of the switch transistor is input with a transistor turn-on voltage.

According to an exemplary aspect of the present disclosure, the circuit may comprise a plurality of switch transistors, and the second electrode of each of the plurality of switch transistors may be input with the same transistor turn-on voltage.

According to an exemplary aspect of the present disclosure, the first electrode of the switch transistor may be a source, while the second electrode may be a drain.

According to another exemplary aspect of the present disclosure, a display device is further provided. The display device comprises a display panel, wherein a gate drive area of the display panel may comprise the exemplary circuit described above.

According to an exemplary aspect of the present disclosure, the gate drive area may further comprise a gate drive circuit, and the plurality of gate lines connected with each control line may comprise portions located in the gate drive circuit.

By means of the circuit, a switch-on level (i.e., a switch-on signal) can be provided to gate lines on a display panel in a time division manner by a control line, such that when a certain control line is accessed by a switch-on level, all the thin film transistors connected by gate lines that are connected with it are switched on, so as to mitigate or eliminate a shutdown afterimage phenomenon. Moreover, since the gate lines are grouped and respective groups are controlled by different control lines, and different control lines are switched on at certain time intervals, the possibility of damaging the display panel by a relatively large instantaneous current generated at shutdown caused by switching on a single control line in the case of using the control line can be avoided, which can in turn protect the circuit effectively.

DETAILED DESCRIPTION

The present invention and associated general inventive concepts will be further described hereinafter in detail with reference to the accompanying drawings and various exemplary embodiments. One of ordinary skill in the art will appreciate that these exemplary embodiments only constitute a fraction of the possible embodiments encompassed by the present invention and associated general inventive concepts. As such, the scope of the present disclosure is by no means limited to the exemplary embodiments set forth herein.

It should be understood that when it is stated that an element or a layer is "on," "connected to," or "coupled to" another element or layer, it can be on, connected to, or coupled to another element or layer directly, or there may also be an inserted or intermediate element or layer. On the contrary, when it is stated that an element is "directly on," "directly connected to," or "directly coupled to" another element or layer, no inserted or intermediate element or layer exists.

Figure 4:
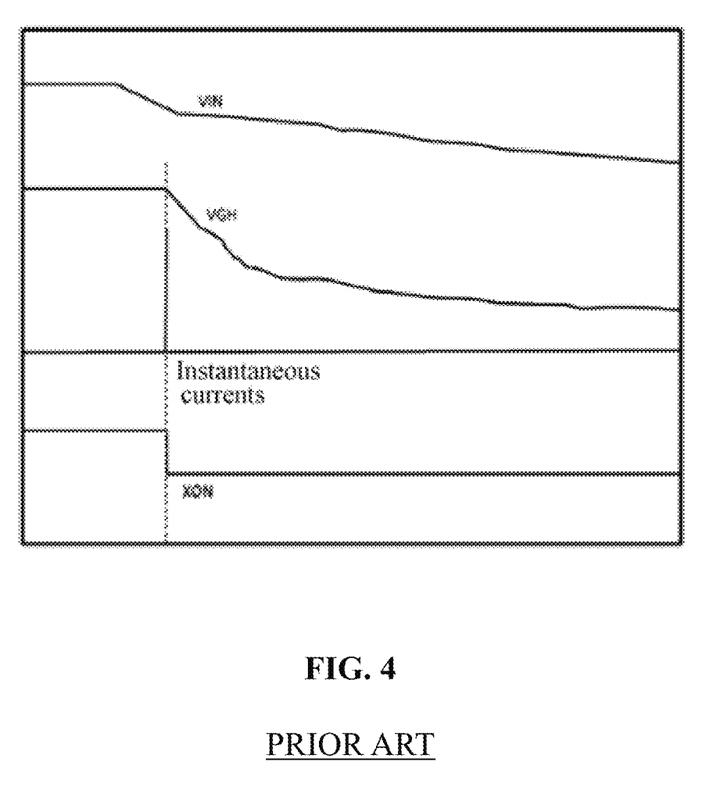
FIG. 4 shows generation of an instantaneous current by the conventional XON signal.

Before describing various exemplary embodiments of the present invention specifically, the aforementioned drawbacks of the conventional XON function circuit will be further explained. In a conventional XON function circuit, when the XON function is initiated, a scan line drive IC outputs a turn-on voltage VGH of TFT, so as to switch on all the TFTs. In order to switch on the TFTs, the voltage of VGH is generally in a range of 20V to 30V. The higher the voltage value of VGH, the greater the instantaneous current generated on the TFT. In a process of pressing the scan line drive IC on a TFT-LCD display panel by an anisotropic conductive film (ACF), after the scan line drive IC is electrically connected to a signal line of the TFT-LCD display panel, a portion the of gold particles for electrical conduction in the ACF are in good contact, while another portion of the gold particles are in bad contact. In the case of less gold particles, the instantaneous current on the gold particles in good contact is relatively large. When the display panel is shut down, since the instantaneous current on the TFT is very large, the current on the gold particles in good contact will also be relatively large. When the current exceeds the endurance capacity of the gold particles, some of the gold particles will be melted and cannot work, while other gold particles will bear these instantaneous currents. The schematic view of generating instantaneous currents is shown in FIG. 4.

Eventually, after starting-up and shutting down numerous times, all the gold particles will be melted, such that the TFT cannot be turned on, thereby resulting in an abnormal display of the screen. Therefore, in the process of pressing the scan line drive IC on the TFT-LCD display panel, the amount of the gold particles should be large enough and the requirement on quality of the gold particles is also very high, otherwise, the phenomenon that the gold particles are melted thereby resulting in abnormal display of the screen may easily occur. As for a high-resolution and large-size display, the problem of abnormal display of screen may easily occur especially when mitigating or eliminating the shutdown afterimage by use of the conventional XON function circuit.

According to an exemplary embodiment of the present disclosure, a circuit, which may be arranged in a gate drive area on a display panel, comprises a plurality of control lines. Each of the plurality of control lines may be connected with a plurality of gate lines, and the plurality of gate lines connected with each control line are distributed at intervals on the display panel. A switch-on level may be provided sequentially to the plurality of control lines in a preset time interval when the display panel is shut down.

The switch-on level of the control line for example may be a high level. That is, the high level can switch on the control line.

In an exemplary embodiment of the circuit, a plurality of control signals for controlling the thin film transistors to switch on are introduced to change the manner of only using one XON signal, and signals for switching on gate lines are provided in a time division manner for different areas of the display panel. In this way, the problem of shutdown afterimage can be solved by employing an XON signal in a GOA circuit. Furthermore, since different control lines are switched on at certain time intervals and the length of the time interval can be selected based on design requirements, the phenomenon of damaging the display panel by a relatively large instantaneous current generated at shutdown caused by switching on a single control line in the case of employing the control line can be avoided, which can in turn protect the circuit effectively.

Figure 5:
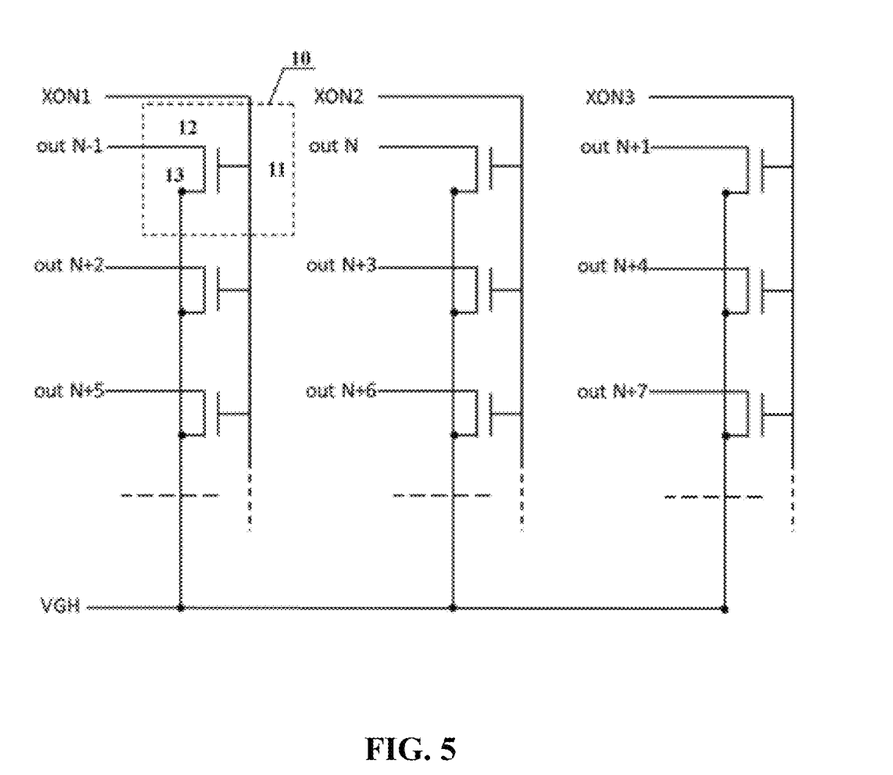
FIG. 5 is a schematic view of a circuit, according to an exemplary embodiment.

For example, in one exemplary embodiment, the number of the control lines for controlling the gate lines is three. FIG. 5 shows a schematic view of a circuit, according to an exemplary embodiment, wherein three control lines are provided.

In the circuit shown in FIG. 5, a control line can output a signal to gate lines for switching on the gate lines. When a switch-on level is provided to a control line, all the gate lines connected with the control line can be switched on. In the case that the number of the control lines is three, adjacent gate lines in a plurality of gate lines connected with each control line can be spaced by two gate lines connected with other control lines in the three control lines. Referring to FIG. 5, three control lines are shown, respectively, as a first control line XON1, a second control line XON2, and a third control line XON3. A plurality of gate lines connected with each control line are distributed at intervals on the display panel, i.e., the plurality of gate lines are not adjacent and are arranged at intervals. For example, the gate lines connected with the first control line XON1 are respectively out N−1 (corresponding to the N−1th output end), out N+2, out N+5 . . . ; the gate lines connected with the second control line XON2 are respectively out N (corresponding to the Nth output end), out N+3, out N+6 . . . ; and the gate lines connected with the third control line XON3 are respectively out N+1 (corresponding to the N+1th output end), out N+4, out N+7 . . . .

According to another exemplary embodiment of the present disclosure, the number of the control lines may be greater than three. As for a circuit comprising more than three control lines, the principle thereof is the same as that of the circuit comprising three control lines, and the difference only lies in that the number of intervals between the gate lines controlled by each control line is increased. However, the manner of connecting the control line with the gate lines is similar as that shown in FIG. 5, i.e., enabling the control lines XON1, XON2, . . . XONn to connect the gate lines in order, until the last control line XONn connects the gate lines, then enabling the control lines XON1, XON2, . . . XONn to connect the gate lines in order repeatedly.

Furthermore, each gate line can be connected with a respective control line for example by a switch transistor. The gate of the switch transistor is connected with the respective control line, a first electrode of the switch transistor is connected with the gate line, and a second electrode of the switch transistor is input with a transistor turn-on voltage. For example, referring to FIG. 5, take the gate line out N−1 as an example. The gate line out N−1 is connected with the control line XON1 by a switch transistor 10. A gate 11 of the switch transistor 10 is connected with the control line XON1, a first electrode 12 of the switch transistor 10 is connected with the gate line out N−1, and a second electrode 13 of the switch transistor 10 is input with a transistor turn-on voltage VGH. When a switch-on level is provided to the control line XON1, the switch transistor 10 is switched on, such that the potential of the gate line out N−1 is the same as the transistor turn-on voltage VGH. Therefore, the gates of all the thin film transistors connected with the gate line out N−1 are accessed by VGH signals, thereby enabling the thin film transistors to be switched on. The connection relationships between other gate lines and the control line as well as the working principle thereof are the same as described above and will not be further described to avoid repetition.

Furthermore, the gates and the first electrodes of the switch transistors as shown in FIG. 5 can be connected to different signals, and the second electrodes of the switch transistors can be connected to the same signal, i.e., the VGH signal. Therefore, the transistor turn-on voltage inputted by the second electrode of each of the switch transistors can be the same. By way of example, the first electrode 12 of the switch transistor 10 may be a source, and the second electrode 13 of the switch transistor 10 may be a drain.

Figure 6:
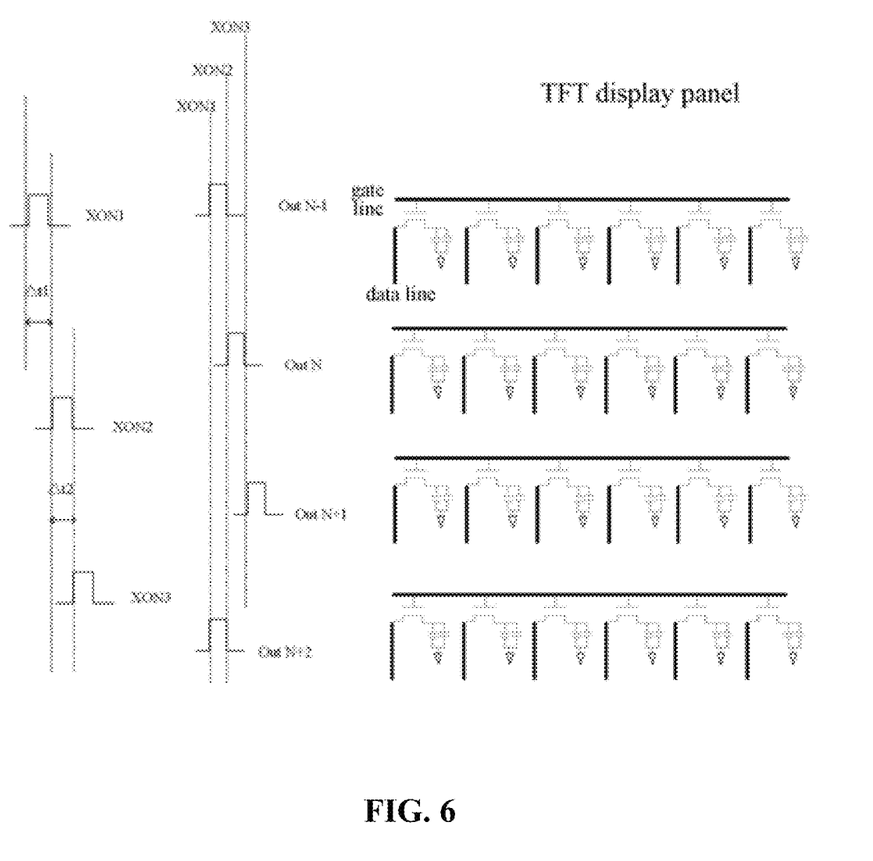
FIG. 6 shows timing of an XON signal used in a GOA circuit, according to an exemplary embodiment.

According to an exemplary embodiment of the present disclosure, the timing of the XON signal used in the GOA circuit is shown in FIG. 6. FIG. 6 also shows an example of a TFT display panel, wherein the gate lines that extend laterally in the display area are connected with the gates of all the thin film transistors in the respective row. The drains of the thin film transistors are connected with the data lines that extend longitudinally, and the sources of the thin film transistors are connected to the common electrode lines by storage capacitance and pixel capacitance.

The timing of the XON signal, as shown in FIG. 6, is not the same as the timing of the conventional XON signal as shown in FIG. 2. In FIG. 6, not all the gate lines are connected to one control line (i.e., a control line that provides an XON signal), instead, a first control line XON1 is connected to the N−1th row of gate lines out N−1 and the N+2th row of gate lines out N+2, a second control line XON2 is connected to the Nth row of gate lines out N, and a third control line XON3 is connected to the N+1th row of gate lines out N+1. Therefore, when a switch-on level is provided to the first control line XON1, all the thin film transistors connected by the N−1th row and N+2th row of gate lines are switched on, while none of the thin film transistors connected by the Nth row and N+1th row of gate lines is switched on. Therefore, the adjacent gate lines (e.g., the N−1th row of gate lines and the Nth row of gate lines) are not switched on simultaneously. Additionally, corresponding sets of the gate lines on the display panel can be controlled by each control line, such that the thin film transistors connected with the corresponding part of the gate lines are switched on at shutdown, so charges can be released in a short time, thereby mitigating or eliminating the shutdown afterimage phenomenon.

Figure 7:
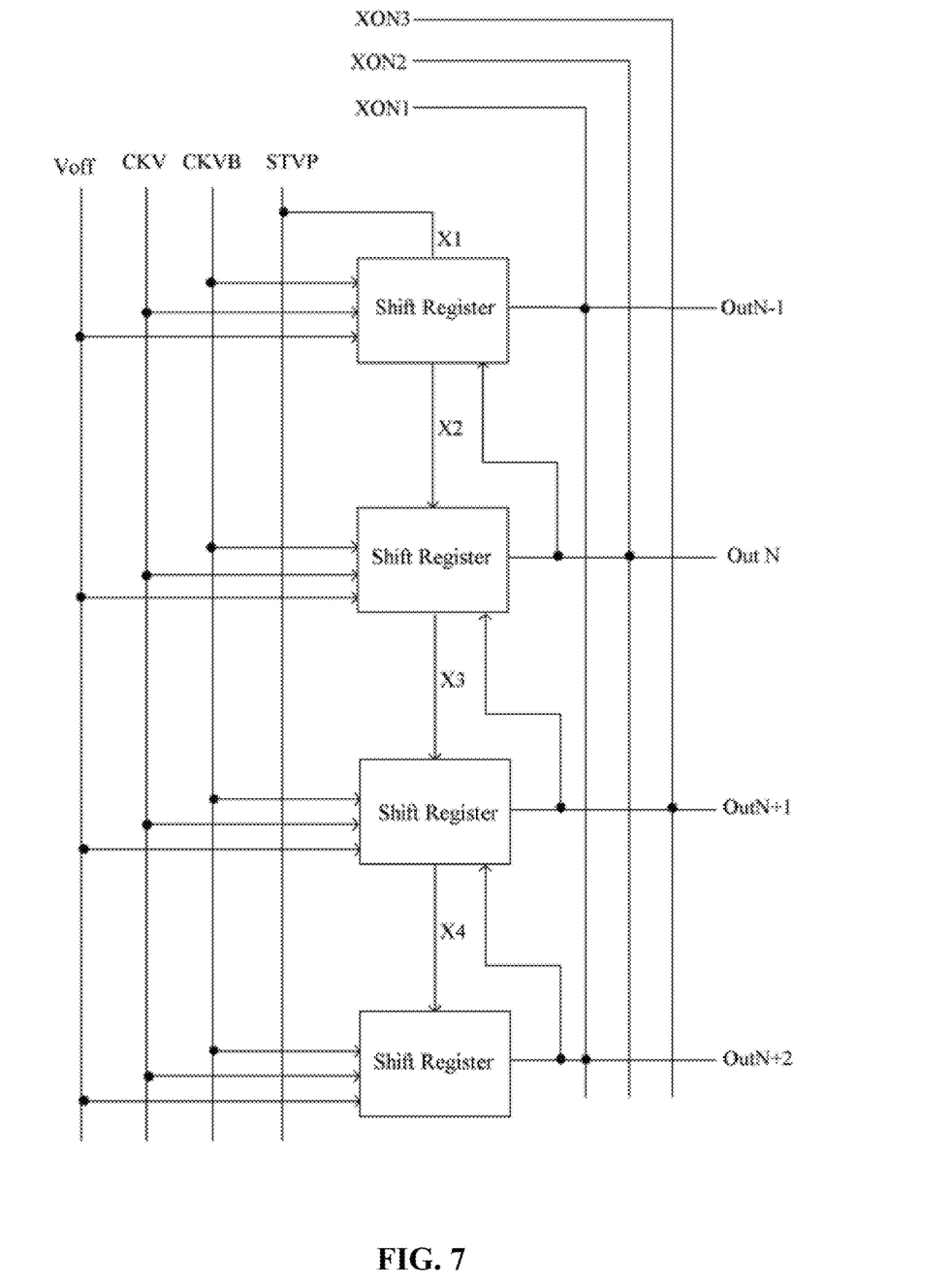
FIG. 7 is a basic principle diagram of a GOA circuit, according to an exemplary embodiment.

FIG. 7 shows a basic principle diagram of a GOA circuit, according to an exemplary embodiment of the present disclosure. As shown in FIG. 7, the first control line XON1 for example can be connected to an output end out N−1 of the N−1th stage of shift registers and an output end out N+2 of the N+2th stage of shift registers, the second control line XON2 for example can be connected to an output end out N of the Nth stage of shift registers, the third control line XON3 for example can be connected to an output end out N+1 of the N+1th stage of shift registers, and so on.

Figure 8:
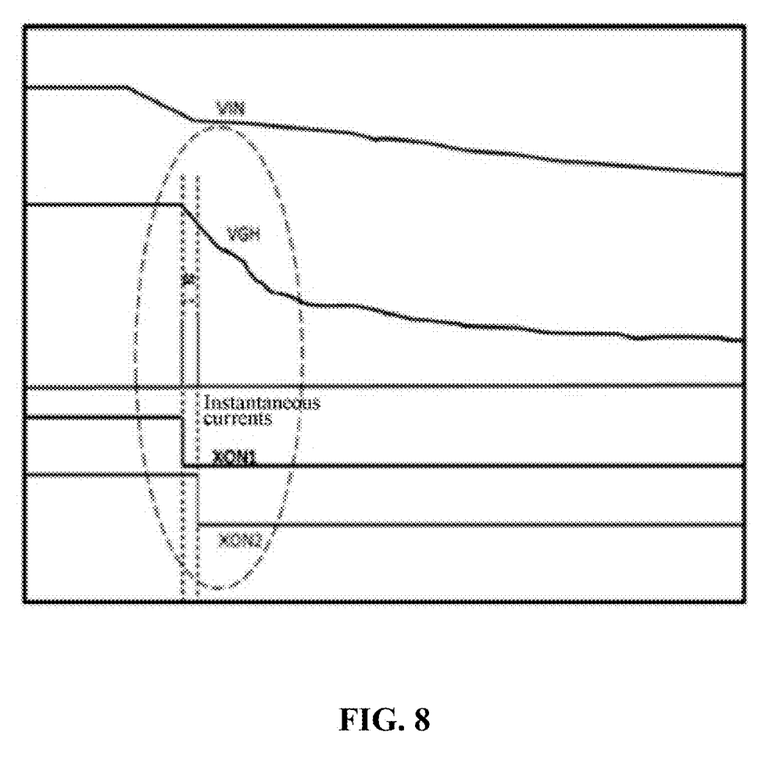
FIG. 8 is a schematic view showing implementation of the XON function while not generating an instantaneous current, according to an exemplary embodiment.

FIG. 8 shows an implementation of the XON function which does not generate an instantaneous current, according to an exemplary embodiment of the present disclosure. Two control lines in FIG. 8 are taken as examples for illustration. As shown in FIG. 8, a switch-on level is provided to the first control line XON1 firstly, then the switch-on level is provided to the second control line XON2 after a certain time interval Δt. Since the switch-on level is not provided to the first control line XON1 and the second control line XON2 simultaneously, even if an instantaneous current were generated, the instantaneous current would not be excessively large, and would thus not result in destroying to the circuit.

Accordingly, a plurality of control lines are provided in a circuit, according to an exemplary embodiment of the present disclosure, to control different gate lines to turn on and turn off, such that an XON signal can also be used in a GOA circuit. Because the plurality of control lines (e.g., XON1, XON2, XON3 . . . ) control the gate lines in a time division manner, all the thin film transistors connected with all the gate lines will not be switched on at the same time. Therefore, not only can the shutdown afterimage phenomenon be mitigated or otherwise eliminated, but the problem that the circuit on the display panel is damaged or otherwise destroyed by a relatively large instantaneous current generated at shutdown can also be avoided, such that the circuit can be protected effectively.

According to an exemplary embodiment of the present disclosure, a display device is further provided, comprising a display panel. A gate drive area of the display panel may comprise the exemplary circuit as described above.

Furthermore, the gate drive area may also comprise a gate drive circuit. A plurality of gate lines connected with each control line in the above exemplary circuit may comprise portions located in the gate drive circuit. For example, the gate lines may extend from the display area of the display panel into the gate drive circuit of the gate drive area. Therefore, the gate lines located in the gate drive circuit can be connected with the control lines of the exemplary circuit described above, thereby realizing connection of the inventive circuit with the gate drive circuit through connection of the control lines and the gate lines. Since the On and Off of respective gate lines can be controlled by the control lines, the On and Off of the thin film transistors connected by respective gate lines can be controlled, thereby mitigating or avoiding afterimages that come up at shutdown.

Furthermore, the exemplary display device not only can mitigate or avoid afterimages that come up at shutdown, but also can avoid a relatively large instantaneous current generated at shutdown, such that the circuit can be protected.

The above embodiments are only exemplary of the present invention and the associated general inventive concepts. It should be noted that one of ordinary skill in the art would appreciate that various modifications and substitutions could be made without departing from the spirit and scope of the present invention.

The invention claimed is:

1. A circuit arranged in a gate drive area on a display panel, the circuit comprising: a plurality of control lines,
wherein each of the plurality of control lines is connected with a plurality of gate lines, and the plurality of gate lines connected with each control line are distributed at intervals on the display panel, and adjacent gate lines in the plurality of gate lines are spaced by gate lines connected with other control lines in the plurality of control lines,
wherein a switch-on level is provided sequentially to the plurality of control lines in a preset time interval when the display panel is shut down, such that the gate lines connected with the control line which is provided with the switch-on level are switched on, and
wherein each of the plurality of gate lines is connected with a respective control line by a switch transistor, wherein the gate of the switch transistor is connected with the respective control line, a source of the switch transistor is directly connected with the gate line, and a drain of the switch transistor is directly connected with a transistor turn-on voltage input terminal, and wherein the transistor turn-on voltage input terminal is different from the respective control line and is not directly connected with the respective control line.

2. The circuit as claimed in claim 1, wherein the number of the plurality of control lines is three, and wherein adjacent gate lines in the plurality of gate lines are spaced by two gate lines connected with other control lines in the plurality of control lines.

3. The circuit as claimed in claim 1, wherein the number of the plurality of control lines is greater than three.

4. The circuit as claimed in claim 1, comprising a plurality of switch transistors, wherein the drain of each of the plurality of switch transistors is input with the same transistor turn-on voltage.

5. A display device comprising: a display panel,
wherein a gate drive area of the display panel comprises a circuit, the circuit comprises a plurality of control lines,
wherein each of the plurality of control lines is connected with a plurality of gate lines, and the plurality of gate lines connected with each control line are distributed at intervals on the display panel, and adjacent gate lines in the plurality of gate lines are spaced by gate lines connected with other control lines in the plurality of control lines,
wherein a switch-on level is provided sequentially to the plurality of control lines in a preset time interval when the display panel is shut down, such that the gate lines connected with the control line which is provided with the switch-on level are switched on, and
wherein each of the plurality of gate lines is connected with a respective control line by a switch transistor, wherein the gate of the switch transistor is connected with the respective control line, a source of the switch transistor is directly connected with the gate line, and a drain of the switch transistor is directly connected with a transistor turn-on voltage input terminal, and wherein the transistor turn-on voltage input terminal is different from the respective control line and is not directly connected with the respective control line.

6. The display device as claimed in claim 5, wherein the number of the plurality of control lines is three, and wherein adjacent gate lines in the plurality of gate lines are spaced by two gate lines connected with other control lines in the plurality of control lines.

7. The display device as claimed in claim 5, wherein the number of the plurality of control lines is greater than three.

8. The display device as claimed in claim 5, comprising a plurality of switch transistors, wherein the drain of each of the plurality of switch transistors is input with the same transistor turn-on voltage.

9. The display device as claimed in claim 5, wherein the gate drive area further comprises a gate drive circuit, and wherein the plurality of gate lines comprise portions located in the gate drive circuit.

* * * * *